Patented Oct. 18, 1932

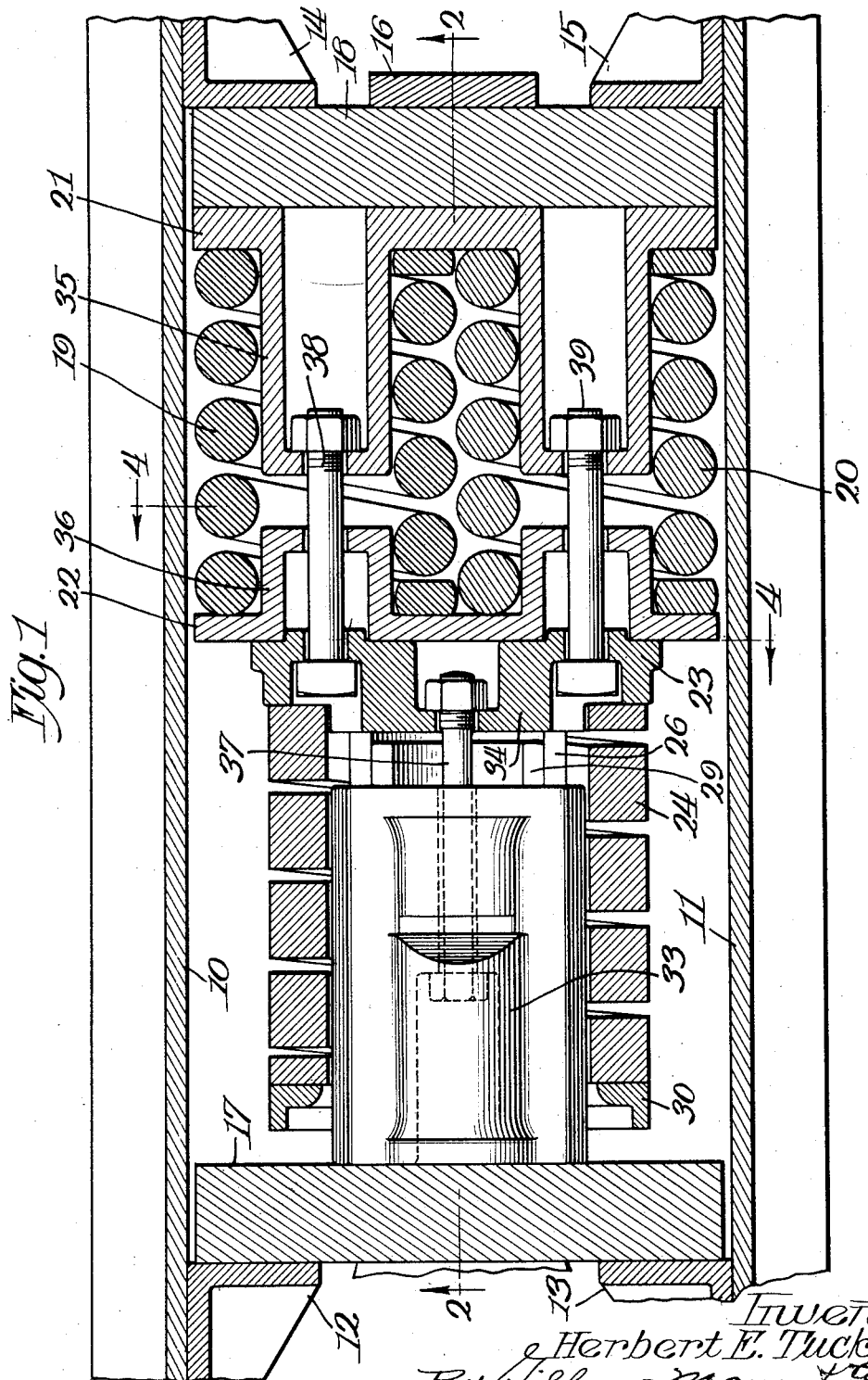

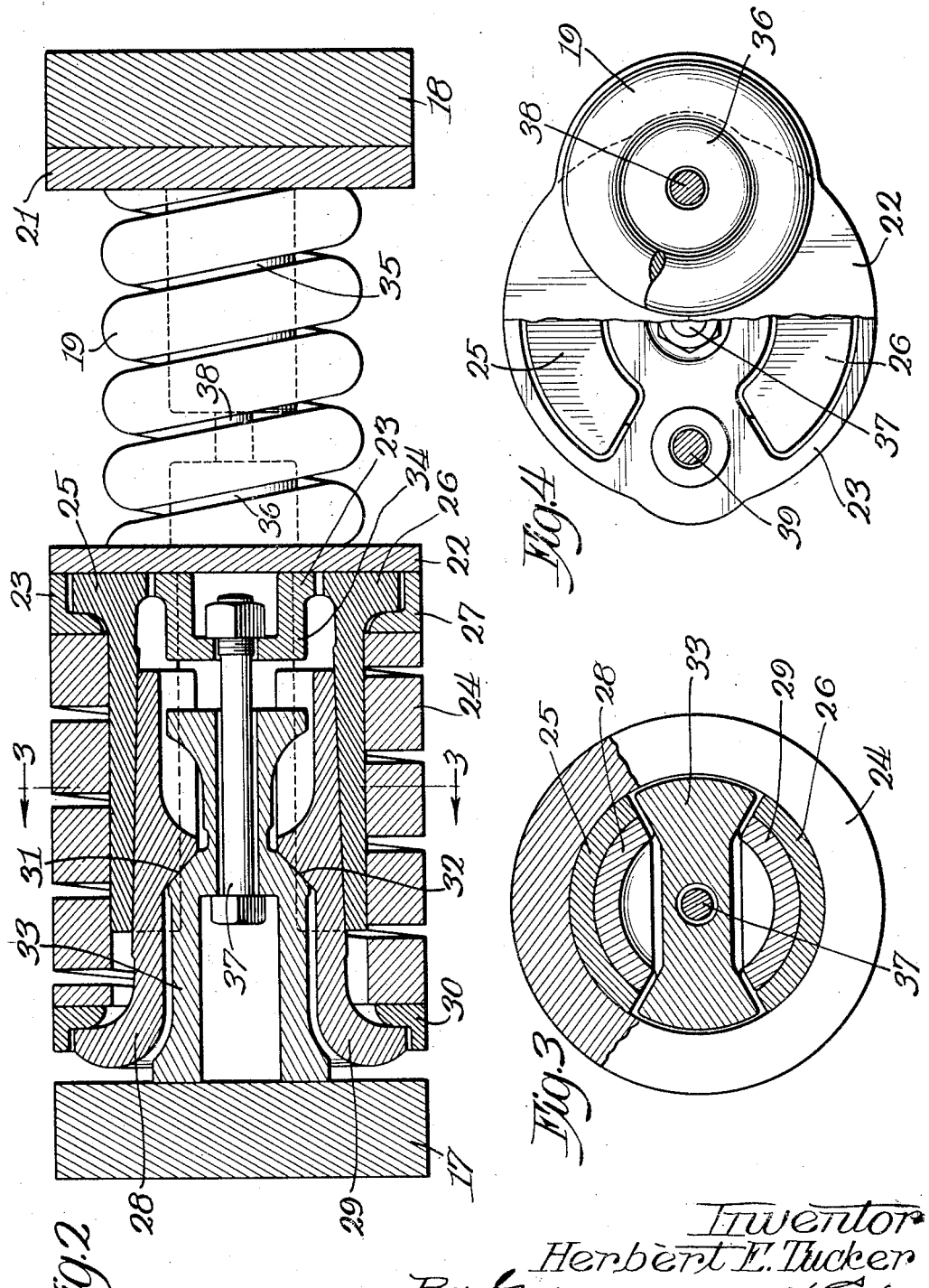

1,883,132

UNITED STATES PATENT OFFICE

HERBERT E. TUCKER, OF CHICAGO, ILLINOIS, ASSIGNOR TO CARDWELL WESTINGHOUSE COMPANY, A CORPORATION OF DELAWARE

DRAFT GEAR

Application filed May 9, 1930. Serial No. 450,908.

The invention relates to draft gears especially adapted for use in connection with passenger cars, but not limited thereto; the objects of the invention being to provide for the absorption of the lighter shocks incident to draft and buffing without calling into play means for absorbing the heavier shocks, such means assuming the entire burden of such shocks.

A further object is to provide for the initial assembly of the dual elements of the gear.

A preferred embodiment of the invention is hereinafter described, and is illustrated in the accompanying drawings, in which Fig. 1 is a central longitudinal plan section of the gear as applied to the framing of the car;

Fig. 2 is a sectional view on the line 2—2 of Fig. 1;

Fig. 3 is a sectional view on the line 3—3 of Fig. 2; and

Fig. 4 is a sectional view on the line 4—4 of Fig. 1.

A part of the underframing of a car is shown in Fig. 1, comprising a pair of draft sills 10, 11, a pair of draft lugs 12, 13, and a pair of buffing lugs 14, 15. The gear is adapted to be enclosed within the usual yoke or coupler extension, indicated at 16, and to cooperate with a pair of draft and buffing followers 17, 18, which are enclosed within the yoke as usual.

The gear comprises a pair of independently acting shock absorbing devices arranged in tandem, and being of substantially different capacity. The weaker of these devices is shown as arranged in the rear of the more powerful one, and comprises a spring or, as shown, a pair of springs 19, 20, which react between a pair of spring seats 21, 22, the former engaging the rear follower 18 and the latter being seated against an intermediate follower 23, which comprises an element of the more powerful device.

The last-named device is of the spring barrel friction type, the spring 24 being helical and formed of a square rod, thereby giving the barrel an interior plain cylindrical surface. A pair of segmental friction shoes 25, 26, are anchored to one end of the spring, being hooked over a spring seat ring 27 which engages the spring seat 22. These shoes are tapering in form and frictionally engage the inner face of the spring 24. A pair of segmental friction shoes 28, 29, are anchored to the opposite end of the spring 24, being hooked over a spring seat 30, and frictionally engage the inner faces of the shoes 25, 26.

The shoes 28, 29, are provided with rearwardly facing and inwardly inclined wedging faces 31, 32, which cooperate with complementary wedging faces formed on a central post or thrust element 33, which seats against the follower 17 and is of such length that it comes into engagement with an intermediate follower 34, having a bearing on the spring seat 22 upon the full compression of the gear.

Over compression of the springs 19, 20, is prevented by bosses, as 35, 36, formed, respectively, on the spring seats 21, 22, and serving the additional function of centering the springs. These bosses are of such length that they come into engagement when the springs have reached the intended or safe limit of compression.

The two shock absorbing devices are of such relative capacity,—the more powerful one having usually approximately three times the resistance of the weaker one,—that the lighter shocks, or those within its capacity, are absorbed exclusively by the weaker device. Shocks which exceed the capacity of the springs 19, 20, bring the bosses 35, 36, into engagement, thereby preventing overcompression of the springs and delivering the load directly to the more powerful device through the intermediate follower 23. Further compression of the gear causes the relative approach of the followers 17 and 23, the compression of the spring 24, relative sliding movement of the spring along the faces of the shoes 25, 26, and of the latter shoes along the faces of the shoes 28, 29, these shoes being moved radially inward by the wedging action of the tapering shoes against the resistance of the wedges 31, 32. Upon full compression of the gear the overload is sustained by the thrust element 33, the follower 23, and the bosses 35, 36.

For the purpose of facilitating the assembly of the gear, and for holding its various parts in assembled relation as a unit before installation, a retaining bolt 37 is set centrally through the thrust element 33 and the intermediate follower 23, and a pair of bolts 38, 39, are set through the intermediate follower 23 and the bosses 35, 36, the nuts applied thereto reacting against the inner ends of the bosses. The elements of the more powerful shock absorber being assembled, the nut on the bolt 37 is turned up to place the spring 24 under a slight degree of compression, the spring seat 22 is now fitted over the bolts 38, 39, the springs 19, 20, are applied to this spring seat, and the seat 21 is placed upon their inner ends and the nuts cooperating with the bolts 38, 39, are turned up to slightly compress them. All of the elements of the dual shock absorbers being now assembled and bound together, the device may be handled as a unit in shipping and installation.

The improved draft gear, while being of very high capacity, relieves the car of both the lighter and heavier shocks to which it may be subjected, and is of especial advantage in connection with passenger cars in that the shocks incident to starting the train are practically completely absorbed by the spring section of the gear, saving the passengers from the annoyance of a succession of jerking movements as the locomotive is placed in motion. During this operation the more powerful friction element of the gear serves substantially as a column, but upon the occurrence of shocks beyond the capacity of the spring section it is brought into action with the same efficiency as if constituted the sole element of the gear.

Furthermore, it is of great importance that the two sections of the gear be so related as to strength that the maximum resistance of the weaker is substantially the same as the primary resistance of the stronger section. By reason of such relation the stronger element serves as an unyielding abutment for the weaker until the latter becomes fully, or approximately fully, compressed, whereupon the excess load is taken up by it without shock. The retaining and adjusting bolts 37 and 38, 39, provide means for insuring such relation of the two sections.

I claim as my invention—

1. In a draft gear, in combination, a pair of independently acting shock absorbing devices of unequal capacity arranged in tandem, the weaker device comprising a spring reacting between a pair of followers one thereof being associated with the stronger device, the stronger device comprising a pair of followers one thereof being the last-named follower, a friction spring barrel and friction and wedge means inclosed within and cooperating with the friction spring, means for limiting the compression of the weaker device and for thereupon transmitting the load to the stronger device, means for holding the elements of the stronger device in assembly and initially adjusting the tension of its spring, and independent means for holding the two devices in assembly and for initially adjusting the tension of the springs of the weaker device.

2. In a draft gear, in combination, a pair of successively acting shock absorbing devices arranged in tandem one thereof being of higher resistance than the other, means for initially tensioning the stronger device and holding its elements in assembly, and independent means for holding the two devices in assembly and adjusting the tension of the weaker device.

In testimony whereof I affix my signature.

HERBERT E. TUCKER.